US012113610B1

(12) United States Patent
Yu et al.

(10) Patent No.: US 12,113,610 B1
(45) Date of Patent: Oct. 8, 2024

(54) USER-DISTINGUISHED FINITE-FIELD RESOURCE CONSTRUCTION METHOD AND FINITE-FIELD MULTIPLE ACCESS SYSTEM

(71) Applicant: HARBIN INSTITUTE OF TECHNOLOGY, Heilongjiang (CN)

(72) Inventors: Qiyue Yu, Heilongjiang (CN); Jiangxuan Li, Heilongjiang (CN); Shu Lin, Heilongjiang (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/612,803

(22) Filed: Mar. 21, 2024

(30) Foreign Application Priority Data

Mar. 21, 2023 (CN) .......................... 202310278443.6

(51) Int. Cl.
*H04J 13/12* (2011.01)
*H04J 13/16* (2011.01)
(52) U.S. Cl.
CPC .............. *H04J 13/12* (2013.01); *H04J 13/16* (2013.01)
(58) Field of Classification Search
USPC ........................................................ 370/208
See application file for complete search history.

(56) References Cited

U.S. PATENT DOCUMENTS

| 5,220,568 | A | * | 6/1993 | Howe | ............... | H03M 13/2703 |
| | | | | | | 341/94 |
| 5,537,427 | A | * | 7/1996 | Chen | ............... | H03M 13/151 |
| | | | | | | 714/781 |
| 7,278,085 | B1 | * | 10/2007 | Weng | ............... | G11C 7/1006 |
| | | | | | | 714/766 |
| 7,952,587 | B2 | * | 5/2011 | Hansen | ............... | G06F 9/383 |
| | | | | | | 712/225 |
| 2017/0185476 | A1 | * | 6/2017 | Wu | ............... | G06F 11/1068 |
| 2017/0367113 | A1 | * | 12/2017 | Huang | ............... | H04L 5/0039 |
| 2019/0312601 | A1 | * | 10/2019 | Kern | ............... | H03M 13/2942 |
| 2020/0313695 | A1 | | 10/2020 | Namboodiri et al. | | |

FOREIGN PATENT DOCUMENTS

CN 110601796 A 12/2019

OTHER PUBLICATIONS

International Search Report of PCT#.

* cited by examiner

*Primary Examiner* — Gregory B Sefcheck
*Assistant Examiner* — Majid Esmaeilian (57) ABSTRACT

The present disclosure relates to the field of communication technologies and in particular to a user-distinguished finite-field resource construction method and a finite-field multiple access system. In order to solve the problem of the limitation of the multiple access resource in the current communication field, the present disclosure employs a user-distinguished finite-field resource construction method to construct a basic-field resource and/or extension-field resource, i.e. finite-field resource. During the use of the finite-field resource, each user sending a binary sequence is assigned one codebook marking symbols that 0 and 1 are respectively mapped into a finite field. The transmitter sends a corresponding finite-field symbol sequence. At the receiver, based on the received finite-field symbols, a finite-field symbol sent by each user can be determined uniquely and thus, a binary symbol sent by each user can be decoded. The present disclosure is applied to the finite-field multiple access system.

11 Claims, 4 Drawing Sheets

USER-DISTINGUISHED FINITE-FIELD RESOURCE CONSTRUCTION METHOD AND FINITE-FIELD MULTIPLE ACCESS SYSTEM

CROSS-REFERENCE TO RELATED APPLICATION

This application claims priority from the Chinese patent application 202310278443.6 filed Mar. 21, 2023, the content of which is incorporated herein in the entirety by reference.

TECHNICAL FIELD

The present disclosure relates to the field of communication technologies and in particular to a user-distinguished finite-field resource construction method and a finite-field multiple access system.

BACKGROUND

The multiple access technology has always been one of the core technologies in the wireless communication field. The multiple access can support multiple user transmissions at the same time. Usually, at transmitter, different physical resources (for example, time-domain resource, frequency-domain resource, code-domain resource and space-domain resource) or their permutations and combinations are allocated to different users; then, at receiver, users are separated and detected based on resource allocation.

The traditional multiple access technology usually employs the classical physical resources (for example, time-domain, frequency-domain, code-domain and space-domain) and these physical resources are usually defined on a complex field. Today, due to shortage of physical-layer resources, how to further serve more users and improve user performance at the same tine has become a new challenge for us.

SUMMARY

The present disclosure aims to solve the problem of limitation of the multiple access resources in the current communication field.

There is provided user-distinguished finite-field resource construction method, wherein the construction method is a basic-field resource construction method and comprises the following steps:

let $GF(p)$ be a prime field, and $p-1$ nonzero elements in the field are divided into $(p-1)/2$ mutually-disjoint element pairs EP, wherein each EP comprises two elements, $k$ and additive inverse $p-k$ in the field, and the element pair $(k, p-k)$ is referred to as additive inverse element pair AIEP; such division is denoted as P;

let J be a positive integer not greater than $(p-1)/2$, namely, $1 \leq J \leq (p-1)/2$; let $C_1, C_2, \ldots, C_J$ be J AIEPs in the P, and thus $C_j = (t_j, p-t_j)$; wherein $1 \leq j \leq J$, $1 \leq t_j \leq p$; $t_j$ is a nonzero element in $GF(p)$, and C refers to a set $\{C_1, C_2, \ldots, C_J\}$;

let $(u_1, u_2, \ldots, u_J)$ be one J tuple on $GF(p)$, wherein $u_j$ is one element in $C_j$; and thus the J tuple $(u_1, u_2, \ldots, u_J)$ is one element in Cartesian product $C_1 \times C_2 \times \ldots \times C_J$; the mod p of each element and $\tau = \oplus_{j=1}^{J} u_j$ in the tuple are referred to as finite-field sum-pattern (FFSP) of the J tuple; wherein $\oplus$ represents modular addition operation;

the J tuple $(p-u_1, p-u_2, \ldots, p-u_J)$ is also one element in Cartesian product and its sum pattern is $p-\tau = p-\oplus_{j=1}^{J} u_j$; if the sum pattern of the $(u_1, u_2, \ldots, u_J)$ is 0, the sum pattern of the $(p-u_1, p-u_2, \ldots, p-u_J)$ is also 0;

let $(u_1, u_2, \ldots, u_J)$ and $(u'_1, u'_2, \ldots, u'_J)$ be two J tuples in $C_1 \times C_2 \times \ldots \times C_J$; if $\oplus_{j=1}^{J} u_j \neq \oplus_{j=1}^{J} u'_j$, one sum pattern uniquely specifies one J tuple in $C_1 \times C_2 \times \ldots \times C_J$, namely, $(u_1, u_2, \ldots, u_J) \leftrightarrow \oplus^J u_j$ is one one-to-one mapping;

given one sum pattern $\tau = \oplus_{j=1}^{J} u_j$, a corresponding J tuple $(u_1, u_2, \ldots, u_J)$ is uniquely restored; the $C_1 \times C_2 \times \ldots \times C_J$ is said to have a unique sum pattern mapping structure USPM, and $J \leq \log_2(p-1)$;

for the set $C = \{C_1, C_2, \ldots, C_J\}$ formed by J AIEPs, if the set has a USPM structure, the set serves as a finite-field resource in multiple access communication;

in one multiple access communication system, J AIEPs are assigned to J users; if each user respectively transmits a corresponding AIEP symbol, a transmitter collects J transmission symbols, obtains finite-field sum-pattern (FFSP) $\tau = \oplus_{j=1}^{J} u_j$ and sends the sum pattern over a multiple access channel; the J transmission symbols are restored uniquely and unambiguously by the sum pattern $\tau$;

if each J tuple is seen as codewords of J users, the set $C = C_1 \times C_2 \times \ldots \times C_J$ forms one J user code totaling $2^J$ codewords in $GF(p)$; $C = C_1 \times C_2 \times \ldots \times C_J$ is said to be one AIEP code uniquely decodable by the J users in $GF(p)$, which is denoted as J user UDAIEP code; when this code is used in a J user multiple access communication system, the symbol sent by the j-th user corresponds to the j-th component $u_j$ of the codewords.

There is provided a user-distinguished finite-field resource construction method, wherein the construction method is an extension-field resource construction method, and comprises the following steps:

based on the constructed basic-field resource, $GF(p^m)$ is an extension field of the $GF(p)$, m is an integer, and an m-order primitive polynomial of the $GF(p^m)$ is expressed as:

$$g(X) = g_0 + g_1 X + g_2 X^2 + \ldots + g_m X^m$$

in this field, there are a total of $p^m$ elements, and $g_0, g_1, \ldots, g_m$ are elements in the $GF(p)$;

let $\alpha$ be a primitive element of the $GF(p^m)$; thus, the elements in the field are represented as $0, 1, \alpha, \alpha^2, \ldots, \alpha^{p^m-2}$; each element is expressed by a linear combination of $\alpha^0 = 1, \alpha, \alpha^2, \ldots \alpha^{m-1}$, and coefficients of the linear combinations all belong to the $GF(p)$, namely, $$\alpha^j = \alpha_{j,0} + \alpha_{j,1} \alpha + \alpha_{j,2} \alpha^2 + \ldots + \alpha_{j,m-1} \alpha^{m-1}$$

wherein the coefficient of the linear combination $\alpha^j = \alpha_{j,0}, \alpha_{j,1}, \alpha_{j,2}, \ldots, \alpha_{j,m-1}$ is an element in the $GF(p)$;

from the above formula, it is seen that $\alpha^j$ is expressed uniquely by the m tuple $(\alpha_{j,0}, \alpha_{j,1}, \ldots, \alpha_{j,m-1})$; thus, a sum of two elements in the extension field is expressed as:

$$\alpha^j + \alpha^k = (\alpha_{j,0} + \alpha_{k,0}) + (\alpha_{j,1} + \alpha_{k,1}) \alpha + \ldots + (\alpha_{j,m-1} + \alpha_{k,m-1}) \alpha^{m-1}$$

the corresponding m tuple is expressed as:

$$((\alpha_{j,0} + \alpha_{k,0}), (\alpha_{j,1} + \alpha_{k,1}), \ldots (\alpha_{j,m-1} + \alpha_{k,m-1}))$$

for $0 \leq i < m$, if $(\alpha_{j,i}, \alpha_{k,i})$ is an additive inverse pair on the $GF(p)$, namely, $\alpha_{j,i} + \alpha_{k,i} = 0$, then, $\alpha^j + \alpha^k = 0$, namely, $(\alpha^j, \alpha^k)$ is one AIEP on the $GF(p^m)$; if $(\alpha_{j,i}, \alpha_{k,i})$ is a nonzero AIEP on the $GF(p)$, then $\alpha^i(\alpha_{j,i}, \alpha_{k,i}) \square (\alpha_{j,i} \alpha^i, \alpha_{k,i} \alpha^i)$ is one AIEP on the $GF(p^m)$;

let $C = (C_1, C_2, \ldots, C_J)$ be an AIEP set on the $GF(p)$, and have a USPM structure; let $C_j = (t_j, p-t_j)$, and use $\psi_i(t_j, p-t_j)$ to represent an AIEP on the $GF(p^m)$ : $\alpha^i C_j = (t_j \alpha^i, (p-t_j) \alpha^i)$, thus, $\Psi_i = \{\psi_i(t_1, p-t_1), \psi_i(t_2, p-t_2), \ldots, \psi_i(t_J, p-t_J)\}$ is an AIEP set with the USPM structure on the $GF(p^m)$; the Cartesian product of the elements in the $\Psi_i$ forms a J user UDAIEP code containing $2^J$ codewords on the GF($p^m$); for i=0,1, ..., m-1, m J user UDAIEP codes are constructed, and $\Psi_0, \Psi_1, \ldots, \Psi_{m-1}$ are mutually disjoint;

the elements in the AIEP pair $\psi_i(t_j, p-t_j)=(t_j\alpha^i, (p-t_j)\alpha^i)$ are expressed by the m tuple in the following form; in the m tuple, $t_j$ and $p-t_j$ appear at the i-th position with other positions being zero, namely:

$$\psi_i(t_1, p-t_1)=((0,0, \ldots, t_1, 0, \ldots, 0), (0,0, \ldots, p-t_1, 0, \ldots, 0))$$

$$\psi_i(t_2, p-t_2)=((0,0, \ldots, t_2, 0, \ldots, 0), (0,0, \ldots, p-t_2, 0, \ldots, 0))$$

.

.

.

$$\psi_i(t_m, p-t_m)=((0,0, \ldots, t_m, 0, \ldots, 0), (0,0, \ldots, p-t_m, 0, \ldots, 0))$$

wherein $\Psi_0, \Psi_1, \ldots, \Psi_{m-1}$ defines m orthogonal UDAIEPs corresponding to J users;

$\Psi \square \Psi_0 \cup \Psi_1 \cup \ldots \cup \Psi_{m-1}$ forms one Jm user orthogonal UDAIEP code containing $2^{Jm}$ codewords on the GF($p^m$).

There is provided a downlink transmission method using a finite-field resource, wherein by using as a finite field the basic-field resource constructed using the user-distinguished finite-field resource construction method or the extension-field resource constructed using the user-distinguished finite-field resource construction method, downlink transmission is achieved, which comprises the following specific steps:

the basic-field resource or extension-field resource of the finite field is used as a multiple access resource, the finite field is GF(p), and p>2; thus, the number of users supported by a finite-field multiple access system is J≤⌊log2(p-1)⌋, and based on the process of constructing the basic-field resource or extension-field resource, the J user UDAIEP code, i.e. $C_1, C_2, \ldots, C_J$ is constructed as a multiple access resource and the user j is assigned a codebook $C_j$;

let k be a positive number, and $b_j=(b_{j,0}, b_{j,1}, \ldots, b_{j,k}, \ldots b_{j,K-1})$ is a raw information sequence sent to the j-th user, where $b_{j,k} \in$ GF(2); during sending, one UDAIEP, i.e. $C_j$, is assigned to the user j, the bit $b_{j,k}$ is mapped into $u_{j,k}$, wherein $u_{j,k} \in C_j$; the mapping is a mapping from a binary field to a non-binary field; this process is expressed using the function $F_{B2NB}$, i.e. $u_{j,k}=F_{B2NB}(b_{j,k})$; the sequence $b_j$ sent to the user j is mapped to generate a sequence denoted as $u_j=(u_{j,0}, u_{j,1}, \ldots, u_{j,k}, \ldots, u_{j,K})$, and then the J tuple $(u_{0,k}, u_{1,k}, \ldots, u_{J,k})$ is one codeword of the J user UDAIEP code;

J sequences sent by performing multiplexing: symbols on the corresponding positions of multiple user information sequences are added up on the GF(p); an obtained result is denoted as $u=(u_0, u_1, \ldots, u_k, \ldots u_{K-1})$, wherein $u_k=\oplus_{j=1}^{J} u_{j,k}$; the multiplexed sequence u is finite-field sum-pattern (FFSP) of the J user UDAIEP code C;C is uniquely decodable, and the J sequences $u_1, u_2, \ldots, u_J$ are decoded symbol-wise from u without ambiguity, and the process of decoding the J sequences symbol-wise is denoted as $F_{NB2B}$;

in a downlink system, a sequence w prior to channel encoding is obtained based on the sequence u, and a (N, K) linear block code on GF(Q) is used as a channel encoding v; then the symbols are mapped to a complex field, and then OFDM transmission process is performed;

finally, the sequence of each user is decoded symbol-wise by using an OFDM receiver.

Furthermore, a process of obtaining the sequence w prior to channel encoding based on the sequence u comprises:

if p and Q are unequal, mapping the sequence u symbol-wise to the sequence w and then performing encoding;

if p and Q are equal, directly using the sequence u as the sequence w and then performing encoding is.

Furthermore, when p and Q are unequal, $t=\lceil \log_2(p-1) \rceil$ and $Q=2^t$ are set.

Furthermore, symbol-wise decoding the sequence of each user by using the OFDM receiver comprise the following steps:

the receiver is a reverse process: firstly, a guard interval is removed, and then FFT transform, FDE and parallel-serial conversion are performed to obtain a complex field signal y, and then a restored sequence $\hat{v}$ is obtained through transform from the complex field to the finite field, and then a sequence $\hat{w}$ is obtained through channel decoding, and then the sequence is symbol-wise mapped from the GF(Q) to the GF(q), which is completely opposite to the mapping of the transmitter; further, a sequence $\hat{u}$ is obtained; if $\hat{u}=u$, the sequence of each user is decoded symbol-wise.

There is provided an uplink transmission method using a finite-field resource, wherein by using as a finite field the extension-field resource constructed using the user-distinguished finite-field resource construction method, uplink transmission is achieved, which comprises the following specific steps:

the extension-field resource is used as a multiple access resource, and based on GF($2^m$), the basic field is GF(2), which only has one element pair (0,1); using the element pair, m orthogonal UDEPs are constructed on the GF($2^m$):

$$\Psi=\{\psi_0(0,1), \psi_1(0,1), \ldots, \psi_i(0,1), \ldots, \psi_{m-1}(0,1)\}$$

if the system supports at most J users, the user J is assigned EP $\psi_{j-1}(0,1)$;

let K be an integer, and $b_j=(b_{j,0}, b_{j,1}, \ldots, b_{j,k}, \ldots, b_{j,K-1})$ is a binary information sequence sent by the user j; the transmitter firstly maps the sequence symbol-wise from the GF(2) to the non-binary field GF($2^m$) to generate a sequence $u_j$, i.e. $u_{j,k}=F_{B2NB}(b_{j,k})$, wherein $u_{j,k} \in$ GF($2^m$); this mapping relationship is determined by EP $\psi_{j-1}(0,1)$ assigned to the user j, and $u_{j,k}$ is expressed by a binary m tuple, $u_{j,k}=(u_{j,k,0}, u_{j,k,1}, \ldots, u_{j,k,i}, \ldots, u_{j,k,m-1})$, wherein, $$u_{j,k,i} = \begin{cases} b_{j,k}, & i = j-1 \\ 0, & i \neq j-1 \end{cases}$$

by adding the (N, K) linear block code W, channel encoding is performed on the sequence $u_j$ to generate a sequence $v_j$, wherein W is a code on the GF($2^m$), and a generated matrix G is K×N dimensions; after encoding, there is:

$$v_j=u_jG=(v_{j,0}, v_{j,1}, \ldots, v_{j,n}, \ldots, v_{j,N-1})$$

and $v_{j,n} \in$ GF($2^m$); and $v_{j,n}$ is expressed by using a binary m tuple $v_{j,n}=(v_{j,n,0}, v_{j,n,1}, \ldots, v_{j,n,i}, \ldots, v_{j,n,m-1})$;

$u=\oplus_{j=1}^{J} u_j$ is defined as finite-field sum-pattern (FFSP) of the raw information sequence, and $u=(u_0, u_1, \ldots, u_k, \ldots, u_{K-1})$, $u_k=\oplus_{j=1}^{J} u_{j,k}$; $v=\oplus_{j=1}^{J} v_j$ is defined as finite-field sum-pattern (FFSP) of the encoded information sequence, and $v=(v_0, v_1, \ldots, v_n, \ldots, v_{N-1})$, wherein $v_n=\oplus_{j=1}^{J} v_{j,n}$, v=uG;

then, modulation is performed using BPSK to obtain a complex-field vector $x_j \in \square^{1 \times Nm}$, $x_j=(x_{j,0}, x_{j,1}, \ldots, x_{j,n}, \ldots, x_{j,N-1})$, $x_{j,n}=(x_{j,n,0}, x_{j,n,1}, \ldots, x_{j,n,i}, \ldots, x_{j,n,m-1})$, and $x_{j,n,i}=2v_{j,n,i}-1$; this mapping relationship is denoted as $F_{F2C}$, that is, a mapping from the finite field to a complex field; then $x_j$ is sent to AWGN multiple access channel;

at the receiver, the received complex-field signal vector $y \in \square^{1 \times Nm}$ is a result of superimposition of the signals sent by J users through the channel, namely, $$y = \sum_{j=1}^{J} x_j + z = r + z$$

wherein z is noise, r is finite-field sum-pattern (FFSP) of the complex-field modulation signal sequence $x_1, x_2, \ldots, x_J$, which is composed of N m tuples, and written as $r=(r_0, r_1, \ldots, r_n, \ldots, r_{N-1})$, wherein $r_n=(r_{n,0}, r_{n,1}, \ldots, r_{n,i}, \ldots, r_{n,m-1})$;

$$r_{n,i} = \sum_{j=1}^{J} x_{j,n,i} = 2\sum_{j=1}^{J} x_{j,n,i} - J$$

in the first step of decoding reception, by using a conversion function $F_{C2F}$ from the complex field to the finite field, the complex-field signal is converted into a vector on the $GF(2^m)$, $F_{C2F}(r)=v=(v_0, v_1, \ldots, v_n, \ldots, v_{N-1})$ is composed of N m tuples, and the n-th element is expressed as $v_n=(v_{n,0}, v_{n,1}, \ldots, v_{n,i}, \ldots, v_{n,m-1})$, wherein, $$v_{n,i} = F_{C2F}(r_{n,i}) = \bigoplus_{j=1}^{J} v_{j,n,i}$$

next, $\hat{y}=F_{C2F}(r)+z$ is constructed and then input into a decoder decoding restoration sequence $\hat{v}$ of the channel encoding W;

an on-field inverse mapping $F_{NB2B}$ is made by the part corresponding to the transmitter to restore the raw sequence $\hat{b}_1, \hat{b}_2, \ldots, \hat{b}_J$ sent by each user.

Furthermore, the $F_{C2F}$ has the following characteristics:

(1) the value of $r_{n,i}$ obtained by BPSK modulation is: $\Omega=\{-J, -J+2, \ldots, J-2, J\}$;

(2) the value of $v_{n,i} \in (2)$ is only $(0)_2$ or $(1)_2$ corresponding to the value of $\Omega$ of the $r_{n,i}$, the value of the $v_{n,i}$ is $\Omega_v = \{0, 1, 0, 1 \ldots\}$, that is: if $r_{n,i}=-J$, then $v_{n,i}=0$; if $r_{n,i}=-J+2$, then $v_{n,i}=1$.

Furthermore, in a process that $\hat{y}$ is constructed and then input into the decoder decoding restoration sequence $\hat{v}$ of the channel encoding W, if soft decoding is used, a prior probability of the $r_{n,i}$ prior probability distribution is $P_r = \{C_J^0/2^J, C_J^1/2^J, \ldots, C_J^{J-1}/2^J, C_J^J/2^J\}$.

There is provided a finite-field multiple access system, wherein a finite-field resource in the system is the extension-field resource constructed using the user-distinguished finite-field resource construction method; a downlink in the system performs downlink transmission using the downlink transmission method using the finite-field resource; an uplink in the system performs uplink transmission using the uplink transmission method using the finite-field resource.

There are the following beneficial effects.

1. The present disclosure provides a novel resource, a finite-field resource, which changes the design method of the current traditional multiple access, improving the design flexibility of the multiple access. The present disclosure is not only applicable to multiple scenarios but also capable of solving in a better way the problem of limitation of the multiple access resource in the communication field. In the finite-field-based downlink multiple access system, each user can obtain channel time diversity and frequency diversity gain at the same time, effectively improving the system reliability; in the finite-field-based uplink multiple access system, the characteristics of the superimposed signals can be fully utilized to more flexibly achieve signal detection and user distinguishing while having the same error rate performance as the classical time division multiple access.

The present disclosure provides a novel multiple access mode based on finite-field resource, which is applicable to downlink multiple access and uplink multiple access. Further, the finite-field multiple access technology provided in the present disclosure further can be compatible with the current classical multiple access theory.

DETAILED DESCRIPTIONS OF EMBODIMENTS

The present disclosure provides a novel multiple access resource defined as a finite-field multiple access resource and based on the finite-field resource, designs a multiple-user uplink multiple access system and a multiple-user downlink multiple access system.

Implementation 1

This Implementation is a user-distinguished finite-field resource construction method, which is a user-distinguished finite-field resource construction method in a finite-field multiple access system. When the finite-field resource is used, each user sending a binary sequence is assigned one codebook marking symbols that 0 and 1 are respectively mapped into a finite field. The transmitter sends a corresponding finite-field symbol sequence. At the receiver, based on the received finite-field symbols, a finite-field symbol sent by each user can be determined uniquely and thus, a binary symbol sent by each user can be decoded.

The user-distinguished finite-field resource construction method in the finite-field multiple access system described in this Implementation can construct a basic-field resource separately or construct an extension-field resource based on the constructed basic-field resource, which is described below in details.

Basic-field resource let GF(p) be a prime field, and p−1 nonzero elements in the field are divided into (p−1)/2 mutually-disjoint element pairs EP, wherein each EP comprises two elements, k and additive inverse p−k in the field, and the element pair (k, p−k) is referred to as additive inverse element pair AIEP; such division is denoted as P;

let J be a positive integer not greater than $(p-1)/2$, namely, $1 \leq J \leq (p-1)/2$; let $C_1, C_2, \ldots, C_J$ be J AIEPs in the P, and thus $C_j=(t_j, p-t_j)$; wherein $1 \leq j \leq J$, $1 \leq t_j \leq p$; $t_j$ is a nonzero element in GF(p), and C refers to a set $\{C_1, C_2, \ldots, C_J\}$;

let $(u_1, u_2, \ldots, u_J)$ be one J tuple on GF(p), wherein $u_j$ is one element in $C_j$; and thus the J tuple $(u_1, u_2, \ldots, u_J)$ is one element in Cartesian product $C_1 \times C_2 \times \ldots \times C_J$; the mod p (mod operation) of each element and $\tau = \oplus_{j=1}^{J} u_j$ in the tuple are referred to as finite-field sum-pattern (FFSP) of the J tuple; wherein $\oplus$ represents modular addition operation;

the J tuple $(p-u_1, p-u_2, \ldots, p-u_J)$ is also one element in Cartesian product and its sum pattern is $p-\tau=p-\oplus_{j=1}^{J} u_j$; if the sum pattern of the $(u_1, u_2, \ldots, u_J)$ is 0, the sum pattern of the $(p-u_1, p-u_2, \ldots, p-u_J)$ is also 0;

let $(u_1, u_2, \ldots, u_J)$ and $(u'_1, u'_2, \ldots, u'_J)$ be two J tuples in $C_1 \times C_2 \times \ldots \times C_J$; if $\oplus_{j=1}^{J} u_j \neq \oplus_{j=1}^{J} u'_j$, one sum pattern uniquely specifies one J tuple in $C_1 \times C_2 \times \ldots \times C_J$, namely, $$(u_1, u_2, \ldots, u_J) \leftrightarrow \bigoplus_{j=1}^{J} u_j$$

is one one-to-one mapping;

in this example, given one sum pattern $\tau = \oplus_{j=1}^{J} u_j$, we can uniquely restore a corresponding J tuple $(u_1, u_2, \ldots, u_J)$; the $C_1 \times C_2 \times \ldots \times C_J$ is said to have a unique sum pattern mapping structure USPM, and at this time, $J \leq \log_2(p-1)$;

for the set $C=\{C_1, C_2, \ldots, C_J\}$ formed by J AIEPs, if the set has a USPM structure, the set serves as a finite-field resource in multiple access communication;

in one multiple access communication system, J AIEPs are assigned to J users; if each user respectively transmits a corresponding AIEP symbol, a transmitter collects J transmission symbols, obtains finite-field sum-pattern (FFSP) $\tau = \oplus_{j=1}^{J} u_j$ and sends the sum pattern over a multiple access channel; the J transmission symbols are restored uniquely and unambiguously by the sum pattern $\tau$;

if each J tuple is seen as codewords of J users, the set $C=C_1 \times C_2 \times \ldots \times C_J$ forms one J user code totaling $2^J$ codewords in GF(p); $C=C_1 \times C_2 \times \ldots \times C_J$ is said to be one AIEP code uniquely decodable by the J users in GF(p), which is denoted as J user UDAIEP code; when this code is used in a J user multiple access communication system, the symbol sent by the j-th user corresponds to the j-th component $u_j$ of the codewords.

Extension-Field Resource based on the above basic-field resource, m is one integer, $GF(p^m)$ is an extension field of the GF(p), and an m-order primitive polynomial of the $GF(p^m)$ is expressed as:

$g(X) = g_0 + g_1 X + g_2 X^2 + \ldots + g_m X^m$ in this field, there are a total of $p^m$ elements, and $g_0, g_1, \ldots, g_m$ are elements in the GF(p);

let $\alpha$ be a primitive element of the $GF(p^m)$; thus, the elements in the field are represented as $0, 1, \alpha, \alpha^2, \ldots, \alpha^{p^m-2}$; each element is expressed by a linear combination of $\alpha^0=1, \alpha, \alpha^2, \ldots, \alpha^{m-1}$, and coefficients of the linear combinations all belong to the GF(p), namely, $\alpha^j = \alpha_{j,0} + \alpha_{j,1}\alpha + \alpha_{j,2}\alpha^2 + \ldots + \alpha_{j,m-1}\alpha^{m-1}$ wherein the coefficient of the linear combination $\alpha^j = \alpha_{j,0}, \alpha_{j,1}, \alpha_{j,2}, \ldots, \alpha_{j,m-1}$ is an element in the GF(p);

from the above formula, it is seen that $\alpha^j$ is expressed uniquely by the m tuple $(\alpha_{j,0}, \alpha_{j,1}, \ldots, \alpha_{j,m-1})$; thus, a sum of two elements in the extension field is expressed as:

$\alpha^j + \alpha^k = (\alpha_{j,0} + \alpha_{k,0}) + (\alpha_{j,1} + \alpha_{k,1})\alpha + \ldots + (\alpha_{j,m-1} + \alpha_{k,m-1})\alpha^{m-1}$ the corresponding m tuple is expressed as:

$((\alpha_{j,0}+\alpha_{k,0}), (\alpha_{j,1}+\alpha_{k,1}), \ldots (\alpha_{j,m-1}+\alpha_{k,m-1}))$, for $0 \leq i < m$, if $(\alpha_{j,i}, \alpha_{k,i})$ is an additive inverse pair on the GF(p), namely, $\alpha_{j,i} + \alpha_{k,i} = 0$, then, $\alpha^j + \alpha^k = 0$, namely, $(\alpha^j, \alpha^k)$ is one AIEP on the $GF(p^m)$; if $(\alpha_{j,i}, \alpha_k)$ is a nonzero AIEP on the GF(p), then $\alpha^i(\alpha_{j,i}, \alpha_{k,i}) \square (\alpha_{j,i}\alpha^i, \alpha_{k,i}\alpha^i)$ is one AIEP on the $GF(p^m)$;

let $C=(C_1, C_2, \ldots, C_J)$ be an AIEP set on the GF(p), and have a USPM structure; let $C_j=(t_j, p-t_j)$, and use $\psi_i(t_j, p-t_j)$ to represent an AIEP on the $GF(p^m)$: $\alpha^i C_j = (t_j \alpha^i, (p-t_j)\alpha^i)$, thus, $\Psi_i = \{\psi_i(t_1, p-t_1), \psi_i(t_2, p-t_2), \ldots, \psi_i(t_J, p-t_J)\}$ is an AIEP set with the USPM structure on the $GF(p^m)$; the Cartesian product of the elements in the $\Psi_i$ forms a J user UDAIEP code containing $2^J$ codewords on the $GF(p^m)$; for $i=0, 1, \ldots, m-1$, m J user UDAIEP codes are constructed, and $\Psi_0, \Psi_1, \ldots, \Psi_{m-1}$ are mutually disjoint;

the elements in the AIEP pair $\psi_i(t_j, p-t_j) = (t_j \alpha^i, (p-t_j)\alpha^i)$ are expressed by the m tuple in the following form; in the m tuple, $t_j$ and $p-t_j$ appear at the i-th position with other positions being zero, namely:

$\psi_i(t_1, p-t_1) = ((0, 0, \ldots, t_1, 0, \ldots, 0), (0, 0, \ldots, p-t_1, 0, \ldots, 0))$ $\psi_i(t_2, p-t_2) = ((0, 0, \ldots, t_2, 0, \ldots, 0), (0, 0, \ldots, p-t_2, 0, \ldots, 0))$

.

.

.

$\psi_i(t_m, p-t_m) = ((0, 0, \ldots, t_m, 0, \ldots, 0), (0, 0, \ldots, p-t_m, 0, \ldots, 0))$ wherein $\Psi_0, \Psi_1, \ldots, \Psi_{m-1}$ defines m orthogonal UDAIEPs corresponding to J users;

$\Psi \square \Psi_0 \cup \Psi_1 \cup \ldots \cup \Psi_{m-1}$ forms one Jm user orthogonal UDAIEP code containing $2^{Jm}$ codewords on the $GF(p^m)$.

Implementation 2

Figure 1:
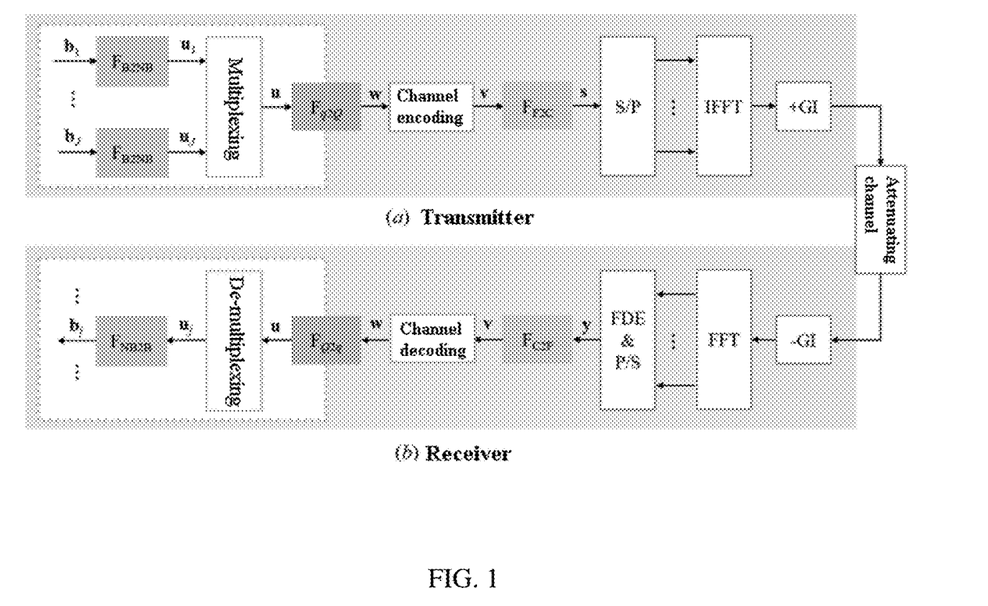
FIG. 1 is a block diagram of a downlink transmission system.

This Implementation is a downlink transmission method using a finite-field resource, wherein by using as a finite field the basic-field resource or the extension-field resource constructed using the user-distinguished finite-field resource construction method in the Implementation 1, downlink transmission is achieved, which comprises the following specific steps:

the basic-field resource or extension-field resource of the finite field is used as a multiple access resource, the finite field is GF(p), and $p > 2$; thus, the number of users supported by a finite-field multiple access system is $J \leq \lfloor \log_2(p-1) \rfloor$, and based on the process of constructing the basic-field resource or extension-field resource, the J user UDAIEP code, i.e. $C_1, C_2, \ldots, C_J$ is constructed as a multiple access resource and the user j is assigned a codebook $C_j$; the system block diagram is as shown in FIG. 1;

let k be a positive number, and $b_j = (b_{j,0}, b_{j,1}, \ldots, b_{j,k}, \ldots b_{j,K-1})$ is a raw information sequence sent to the j-th user, where $b_{j,k} \in GF(2)$; during sending, one UDAIEP, i.e. $C_j$, is assigned to the user j, the bit $b_{j,k}$ is mapped into $u_{j,k}$, wherein $u_{j,k} \in C_j$; the mapping is a mapping from a binary field to a non-binary field; this process is expressed using the function $F_{B2NB}$, i.e. $u_{j,k} = F_{B2NB}(b_{j,k})$; the sequence $b_j$ sent to the user j is mapped to generate a sequence denoted as $u_j = (u_{j,0}, u_{j,1}, \ldots, u_{j,k}, \ldots, u_{j,K})$, and then the J tuple $(u_{0,k}, u_{1,k}, \ldots, u_{J,k})$ is one codeword of the J user UDAIEP code;

J sequences sent by performing multiplexing: symbols on the corresponding positions of multiple user information sequences are added up on the GF(p); an obtained result is denoted as $u=(u_0,u_1, \ldots, u_k, \ldots u_{K-1})$, wherein $u_k=\oplus_{j=1}^{J}u_{j,k}$; it can be seen that the multiplexed sequence u is finite-field sum-pattern (FFSP) of the J user UDAIEP code C;C is uniquely decodable, and the J sequences $u_1,u_2, \ldots, u_J$ are decoded symbol-wise from u without ambiguity, and the process of decoding the J sequences symbol-wise is denoted as $F_{NB2B}$;

in a downlink system, as shown in FIG. 1, a (N, K) linear block code M on GF(Q) is used as a channel encoding; and a generated matrix is G; when p and Q are equal, the mapping from GF(p) to GF(Q) as shown in FIG. may not be used, and otherwise, the sequence u may be mapped symbol-wise to generate a sequence w as shown by $F_{q2Q}$ in FIG: $w_k=F_{q2Q}(u_k)$; then, encoding is performed using the channel encoding M, v=wG; then the symbols are mapped to a complex field, and subsequently, standard OFDM transmission process is performed, namely, serial-parallel conversion and IFFT are performed, and then transmission is performed together with cyclic prefix to the attenuating channel.

For simplification of calculation, when p and Q are unequal, $t=\lceil\log_2(p-1)\rceil$ and $Q=2^t$ are set; one-to-one correspondence of elements in two fields is constructed randomly to ensure the elements in GF(p) can be in one-to-one correspondence with the elements in GF(Q). If $p-1=2^t$, there is a simpler mapping. Let a be a primitive element of $GF(2^m)$, and thus $w_k=F_{q2Q}(u_k)=\alpha^{u_k-2}$, wherein $\alpha^{-1}=0$ is defined.

The receiver is a reverse process: firstly, it is a standard OFDM receiver; namely, a guard interval is removed, and then FFT transform, FDE and parallel-serial conversion are performed to obtain a complex field signal y, and then a restored sequence $\hat{v}$ is obtained through transform from the complex field to the finite field, and then a sequence $\hat{w}$ is obtained through channel decoding, and then the sequence is symbol-wise mapped from the GF(Q) to the GF(q), which is denoted as $F_{Q2q}$ and completely opposite to the mapping of the transmitter; further, a sequence $\hat{u}$ is obtained; if $\hat{u}=u$, the sequence of each user can be decoded symbol-wise because the finite-field code 0 in the present disclosure is uniquely decodable.

Implementation 3

Figure 2:
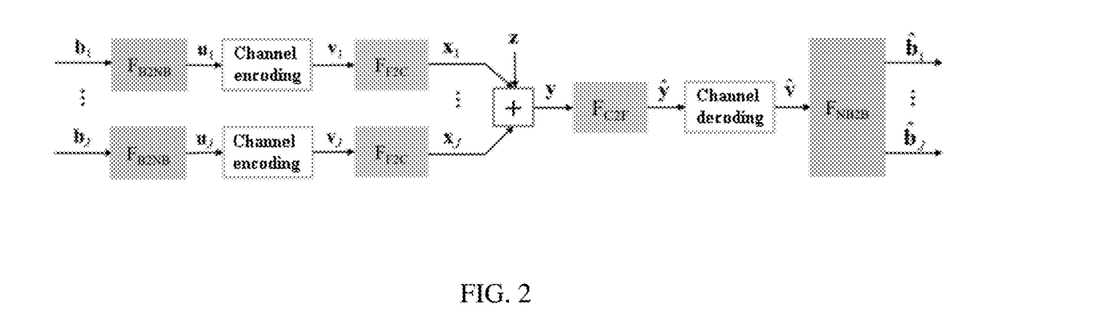
FIG. 2 is a block diagram of an uplink transmission system.

This Implementation is an uplink transmission method using a finite-field resource, wherein by using as a finite field the extension-field resource constructed using the user-distinguished finite-field resource construction method in the Implementation 1, uplink transmission is achieved, which comprises the following specific steps:

the extension-field resource is used as a multiple access resource, and based on $GF(2^m)$, the basic field is GF(2); in this solution, the basic field only has one element pair (0,1); using the element pair, m orthogonal UDEPs are constructed on the $GF(2^m)$:

$$\Psi=\{\psi_0(0,1), \psi_1(0,1), \ldots, \psi_i(0,1), \ldots, \psi_{m-1}(0,1)\}$$

if the system supports at most J users, the user J is assigned EP $\psi_{j-1}(0,1)$; the system block diagram is as shown in FIG. 2;

let K be an integer, and $b_j=(b_{j,0},b_{j,1}, \ldots, b_{j,k}, \ldots, b_{j,K-1})$ is a binary information sequence sent by the user j; the transmitter firstly maps the sequence symbol-wise from the GF(2) to the non-binary field $GF(2^m)$ to generate a sequence $u_j$, i.e. $u_{j,k}=F_{B2NB}(b_{j,k})$, wherein $u_{j,k}\in GF(2^m)$; this mapping relationship is determined by EP $\psi_{j-1}(0,1)$ assigned to the user j, and $u_{j,k}$ is expressed by a binary m tuple, $u_{j,k}=(u_{j,k,0},u_{j,k,1}, \ldots, u_{j,k,i}, \ldots, u_{j,k,m-1})$, wherein, $$u_{j,k,i} = \begin{cases} b_{j,k}, & i = j-1 \\ 0, & i \neq j-1 \end{cases}$$

by adding the (N, K) linear block code W, channel encoding is performed on the sequence $u_j$ to generate a sequence $v_j$, wherein W is a code on the $GF(2^m)$, and a generated matrix G is K×N dimensions; after encoding, there is:

$$v_j=u_jG=(v_{j,0},v_{j,1}, \ldots, v_{j,n}, \ldots, v_{j,N-1})$$

and $v_{j,n}\in GF(2^m)$; and $v_{j,n}$ is expressed by using a binary m tuple $v_{j,n}=(v_{j,n,0},v_{j,n,1}, \ldots, v_{j,n,i}, \ldots, v_{j,n,m-1})$;

$u=\oplus_{j=1}^{J}u_j$ is defined as finite-field sum-pattern (FFSP) of the raw information sequence, and $u=(u_0,u_1, \ldots, u_k, \ldots, u_{K-1})$, $u_k=\oplus_{j=1}^{J}u_{j,k}$; $v=\oplus_{j=1}^{J}v_j$ is defined as finite-field sum-pattern (FFSP) of the encoded information sequence, and $v=(v_0,v_1, \ldots, v_n, \ldots, v_{N-1})$, wherein $v_n=\oplus_{j=1}^{J}v_{j,n}$, v=uG;

then, modulation is performed using BPSK to obtain a complex-field vector $x_j\in\square^{1\times Nm}$, $x_j=(x_{j,0},x_{j,1}, \ldots, x_{j,n}, \ldots, x_{j,N-1})$, $x_{j,n}=(x_{j,n,0},x_{j,n,1}, \ldots, x_{j,n,i}, \ldots, x_{j,n,m-1})$, and $x_{j,n,i}=2v_{j,n,i}-1$; this mapping relationship is denoted as $F_{2C2}$, that is, a mapping from the finite field to a complex field; then $x_j$ is sent to AWGN multiple access channel;

at the receiver, the received complex-field signal vector $y\in\square^{1\times N}$ is a result of superimposition of the signals sent by J users through the channel, namely, $$y = \sum_{j=1}^{J} x_j + z = r + z$$

wherein z is noise, r is finite-field sum-pattern (FFSP) of the complex-field modulation signal sequence $x_1,x_2, \ldots, x_J$, which is composed of N m tuples, and written as $r=(r_0, r_1, \ldots, r_n, \ldots, r_{N-1})$, wherein $r_n=(r_{n,0},r_{n,1}, \ldots, r_{n,i}, \ldots, r_{n,m-1})$;

$$r_{n,i} = \sum_{j=1}^{J} x_{j,n,i} = 2\sum_{j=1}^{J} x_{j,n,i} - J$$

in the first step of decoding reception, by using a conversion function $F_{C2F}$ from the complex field to the finite field, the complex-field signal is converted into a vector on the $GF(2^m)$, $F_{C2F}(r)=v=(v_0,v_1, \ldots, v_n, \ldots, v_{N-1})$ is composed of N m tuples, and the n-th element is expressed as $v_n=(v_{n,0},v_{n,1}, \ldots, v_{n,i}, \ldots, v_{n,m-1})$, wherein, $$v_{n,i} = F_{C2F}(r_{n,i}) = \bigoplus_{j=1}^{J} v_{j,n,i}$$

The $F_{C2F}$ has the following characteristics:

(1) the value of $r_{n,i}$ obtained by BPSK modulation is: $\Omega=\{-J, -J+2, \ldots, J-2, J\}$;

(2) the value of $v_{n,i}\in GF(2)$ is only $(0)_2$ or $(1)_2$ corresponding to the value $\Omega$ of the $r_{n,i}$, the value of the $v_{n,i}$ is $\Omega_v=\{0,1,0,1\ldots\}$, that is: if $r_{n,i}=-J$, then $v_{n,i}=0$; if $r_{n,i}=-J+2$, then $v_{n,i}=1$, and so on.

Thus, $F_{C2F}$ can be determined.

Next, $\hat{y}=F_{C2F}(r)+z$ is constructed and then input into the decoder decoding restoration sequence $\hat{v}$ of the channel encoding W; if soft decoding is used, a $r_{n,i}$ prior probability distribution for improving decoding performance is provided herein. The value of corresponding to $r_{n,i}$ is $\Omega$, and the prior probability is $P_r=\{C_J^0/2^J, C_J^1/2^J, \ldots, C_J^{J-1}/2^J, C_J^J/2^J\}$.

An on-field inverse mapping $F_{NB2B}$ (each user is assigned a unique EP and thus the sequence sent by each user can be determined symbol-wise) is made by the part corresponding to the transmitter to restore the raw sequence $\hat{b}_1, \hat{b}_2, \ldots, \hat{b}_J$ sent by each user.

Implementation 4

This Implementation is a finite-field multiple access system. In this Implementation, a finite-field resource in the system is the extension-field resource constructed using the user-distinguished finite-field resource construction method in the Implementation 1; a downlink in the system performs downlink transmission using the downlink transmission method using the finite-field resource in the Implementation 2; an uplink in the system performs uplink transmission using the uplink transmission method using the finite-field resource in the Implementation 3.

Embodiments

Embodiment 1: Unique Decodable Code Construction Based on the Finite Field (1) If p=5, two AIEPs may be obtained, $C_1=(1,4)$, $C_2=(2,3)$, and $C_1 \times C_2$ forms a two-user UDAIEP code.

(2) If p=17, eight AIEPs may be obtained: (1,16) (2,15) (3,14) (4,13) (5,12) (6,11) (7,10) (8,9), and at most four AIEPs may be selected therefrom and their Cartesian product can be used as the 4-user UDAIEP code.

Figure 3:
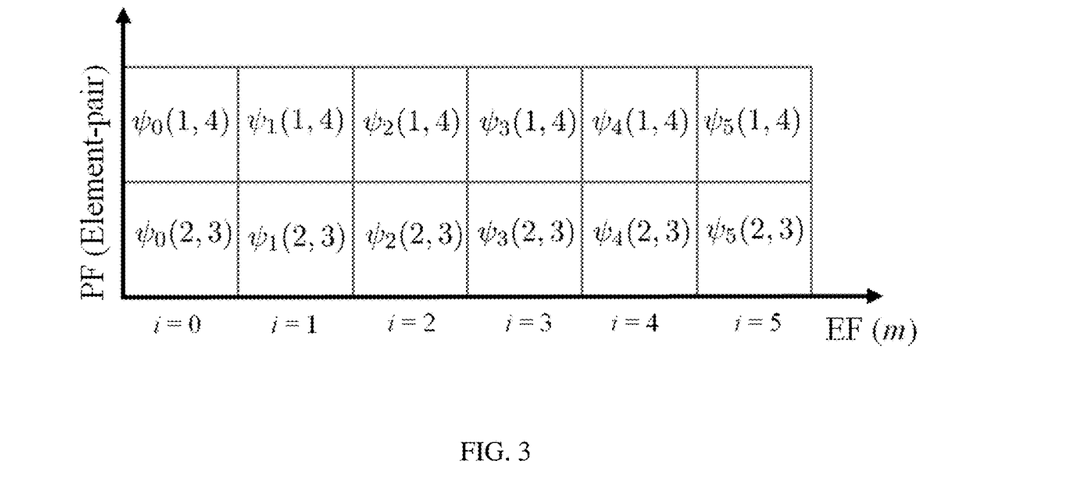
FIG. 3 is a structural schematic diagram of codewords in embodiment 2.

Embodiment 2: Unique Decodable Code Construction Based on the Extension Field of the Finite Field Let p=5 and m=6; considering the extension field $GF(5^6)$ of GF(5), in the example 1, two AIEPs may be constructed in GF(5): $C_1=(1,4)$ and $C_2=(2,3)$; their Cartesian product forms a 2-user UDAIEP code on GF(5); based on this, 12 $GF(5^6)$-based UDAIEP codes can be constructed as follows:
$(\psi_0(C_1),\psi_0(C_2))=(\psi_0(1,4),\psi_0(2,3))$, $(\psi_1(C_1),\psi_1(C_2))=(\psi_1(1,4),\psi_1(2,3))$
$(\psi_2(C_1),\psi_2(C_2))=(\psi_2(1,4),\psi_2(2,3))$, $(\psi_3(C_1),\psi_3(C_2))=(\psi_3(1,4),\psi_3(2,3))$
$(\psi_4(C_1),\psi_4(C_2))=(\psi_4(1,4),\psi_4(2,3))$, $(\psi_5(C_1),\psi_5(C_2))=(\psi_5(1,4),\psi_5(2,3))$ They are divided into 6 orthogonal groups. The Cartesian products of the 6 groups give 6 orthogonal 2-user UDAIEP codes $\Psi_0,\Psi_1,\Psi_2,\Psi_3,\Psi_4,\Psi_5$. They are combined to form one 12-user UDAIEP code containing $2^{12}=4096$ codewords, with the structure as shown in FIG. 3.

Embodiment 3: Detection of the Downlink Receiver

Given the finite field $GF(2^4)$, the number of users J=4 and the sequence length K=1, let the sequence sent by each user be $b_1=(1)_2$, $b_2=(0)_2$, $b_3=(1)_2$, $b_3=(1)_2$, and there are:

$b_1=(1)_2 \to u_1=(1,0,0,0)_2 \to x_1=(+1,-1,-1,-1)$ $b_2=(0)_2 \to u_2=(0,0,0,0)_2 \to x_2=(-1,-1,-1,-1)$ $b_3=(1)_2 \to u_3=(0,0,1,0)_2 \to x_3=(-1,-1,+1,-1)$ $b_4=(1)_2 \to u_4=(0,0,0,1)_2 \to x_4=(-1,-1,-1,+1)$

The received complex-field sum pattern is $$r = \sum_{j=1}^{4} x_j = (-2, -4, -2, -2).$$

Since J=4, there are $\Omega=\{-4,-2,0,+2,+4\}$ and $\Omega_v=\{0,1,0,1,0\}$, namely, $F_{C2F}(-4)=(0)_2$, $F_{C2F}(-2)=(1)_2$, $F_{C2F}(0)=(0)_2$, $F_{C2F}(+2)=(1)_2$, $F_{C2F}(+4)=(0)_2$, and thus $v=F_{C2F}(r)=(1,0,1,1)_2$. Then, by $F_{NB2B}$ mapping, $\hat{b}_1=(1)_2$, $\hat{b}_2=(0)_2$, $\hat{b}_3=(1)_2$, $\hat{b}_4=(1)_2$ can be decoded.

Embodiment 4: Uplink and Downlink System

Let $\alpha$ be a primitive element of GF(73), and a basic matrix of 4×12 shown below is constructed on GF(73):

$$B(4,12) = \begin{bmatrix} \alpha^{48} & 0 & \alpha^{20} & 0 & \alpha^{28} & \alpha^{25} & \alpha^{38} & \alpha^{54} & \alpha^{21} & 0 & \alpha^{64} & 0 \\ 0 & \alpha^{48} & 0 & \alpha^{20} & \alpha^{10} & \alpha^{28} & \alpha^{25} & \alpha^{38} & 0 & \alpha^{21} & 0 & \alpha^{64} \\ \alpha^{59} & \alpha^{41} & \alpha^{48} & \alpha^{29} & \alpha^{20} & 0 & \alpha^{28} & 0 & \alpha^{38} & \alpha^{54} & \alpha^{21} & \alpha^{14} \\ \alpha^{32} & \alpha^{59} & \alpha^{41} & \alpha^{48} & 0 & \alpha^{20} & 0 & \alpha^{28} & \alpha^{25} & \alpha^{38} & \alpha^{54} & \alpha^{21} \end{bmatrix}$$

Then, each element in the basic matrix is replaced using CPM of 72×72 dimensions (the position of 1 in the binary CPM is replaced with the element in $GF(2^4)$, and thus, it is required to construct a mapping of the nonzero element in B(4,12) to $GF(2^4)$ which can be selected randomly to ensure one-to-one mapping), and thus a matrix $H_q(4,12)$ of 288× 864 can be generated. The elements in the matrix are all on $GF(2^4)$, and the matrix is used as a check matrix of the channel encoding of the uplink and downlink system. The code length of the corresponding code is N=864 and the information bit length is K=576.

Figure 4:
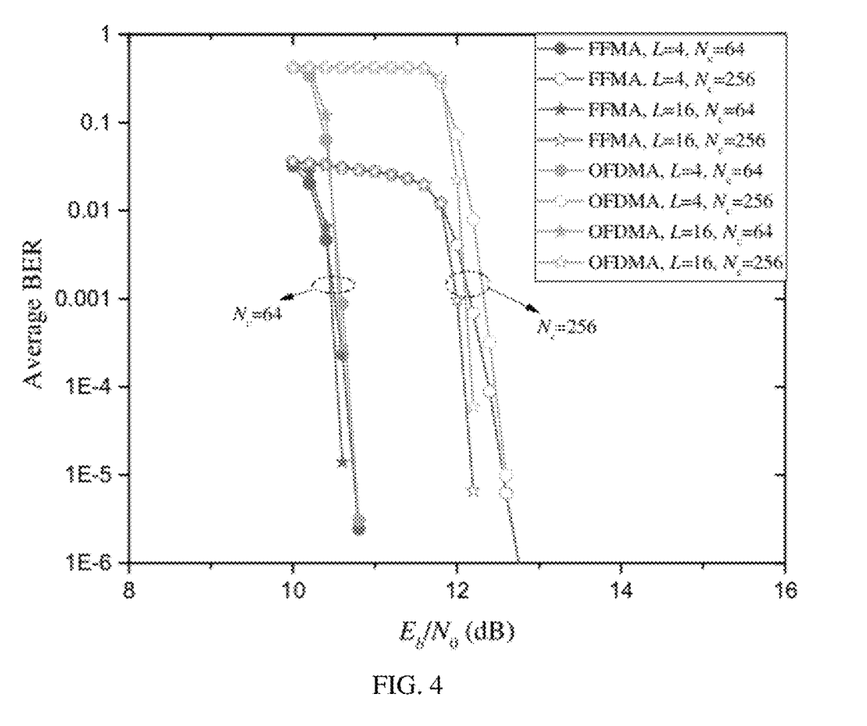
FIG. 4 is a comparison diagram of FFMA downlink system and OFDMA system.

In the downlink, based on GF(17), the finite-field resource (shown in example 1) is constructed. The number of the supported users is J=4, the channel is a frequency-selective channel, the cyclic prefix number $N_g$ is set to 16, the subcarrier number is set to 64 and 256, and the path number L is respectively set to 4 and 16. Furthermore, compared with the equivalent OFDMA system, the result is as shown in FIG. 4, which proves that the FFMA system is improved in performance.

Figure 5:
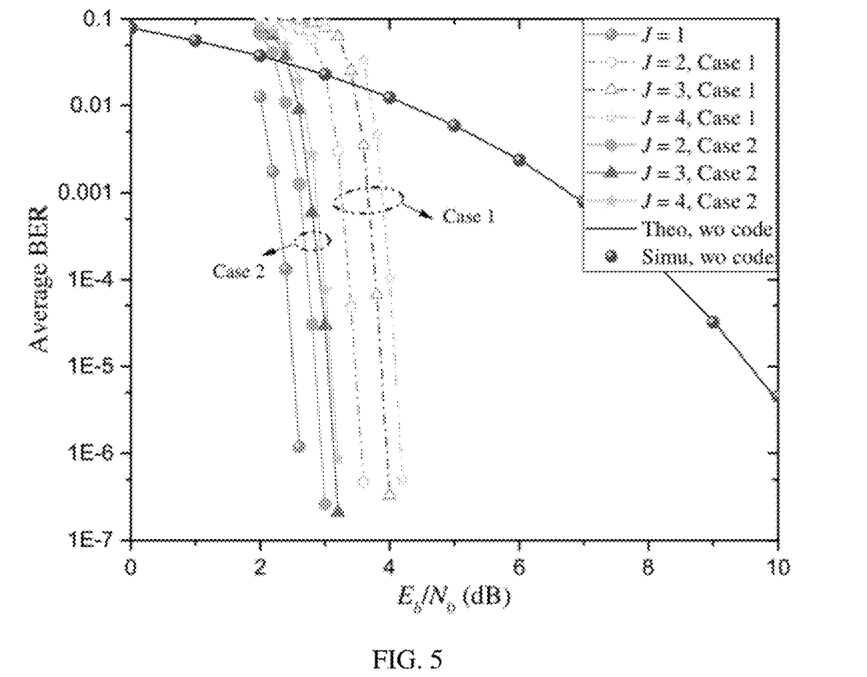
FIG. 5 is a performance simulation diagram of FFMA downlink system.

In the uplink, the finite-field resource is obtained using $GF(2^4)$, and the maximum number of the users supported by the system is J=4, and matches the above designed channel encoding to save one field transform. The simulation result is as shown in FIG. 5, where case1 represents that we use the prior probability recommended by the present disclosure and the case2 represents that we uses the generated matrix of the system form in encoding, reducing interference between multiple users, achieving better performance. We can see from the FIG that the FFMA downlink system has an improvement in performance.

The computation examples of the present disclosure are only computation models and computation flows for detailing the present disclosure rather than limitations to the embodiments of the present disclosure. Those skilled in the arts can also make other changes or variations of different forms on the basis of the above descriptions and cannot exhaust all embodiments herein. Those obvious changes or variations derived from the technical solutions of the present disclosure shall all fall within the scope of protection of the present disclosure.

The present disclosure can be applied in multiple access direction application: This disclosure provides new orthogonal resources—finite field resources. Different from other orthogonal resources, the finite field resources are kinds of virtual resources capable of distinguishing users by using the properties of finite fields, and can be used as a novel multiple access technique.

Further the present disclosure can be applied in Network layer direction application: The finite field resources provided by the present invention are capable of distinguishing users, assisting in network layer research, and integrating the network routing protocol, network coding and finite field resources to further improve the transmission efficiency.

Further, the present disclosure can be applied in Ultra-large-scale machine-type communication application: Ultra-large-scale machine-type communication is one of the application scenarios of 6G. This patent can be used as a multiple access technique in this scenario to facilitate short-packet communication among massive users. Compared with the existing multiple access techniques, it can better reduce interference among users, making the symbol error rate of each user closer to that of a single-user operating system, and featuring lower decoding complexity.

Further, the present disclosure can be applied in anti-interference technology application: Traditional multi-channel interference cancellation technology performs signal processing by using a method of recovering and cancelling each channel of signal. In the Finite Field Multiple Access (FFMA) technique provided herein, multi-channel signals are considered as a whole, and information is distinguished in a finite field.

Further, the present disclosure can be applied in multi-antenna transmission application: the feature of distinguishing users (or data streams) of the finite field can be applied to a multi-antenna scenario, to implement a novel multi-antenna transmission technology.

Figure 6:
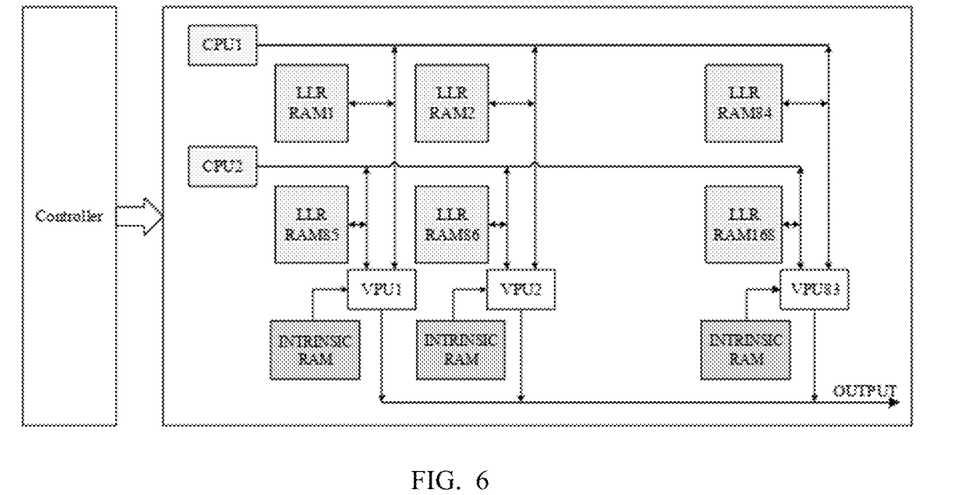
FIG. 6 is a diagram of the implementation of the present disclosure in one embodiment.

As shown in FIG. 6, on the receiver side, the min-sum algorithm (MSA) is adopted, and a field-programmable gate array (FPGA) is employed to implement the solution, with specific implementation shown in the block diagram below, including a control module (Controller), a check node processing unit (CPU), a variable node processing unit (VPU), an intrinsic random access memory (Intrinsic RAM), and a log-likelihood ratio random access memory (LLR RAM).

Further, the proposed Finite-field multiple-access (FFMA) technique can be applied into multiple-access scenario, network scenario (such as digital twin, virtual reality, and etc.), ultra massive machine type communications (um-MTC), and etc. The proposed FFMA technique can solve the multiuser interference (MUI) issue with a low detection complexity.

Figure 7:
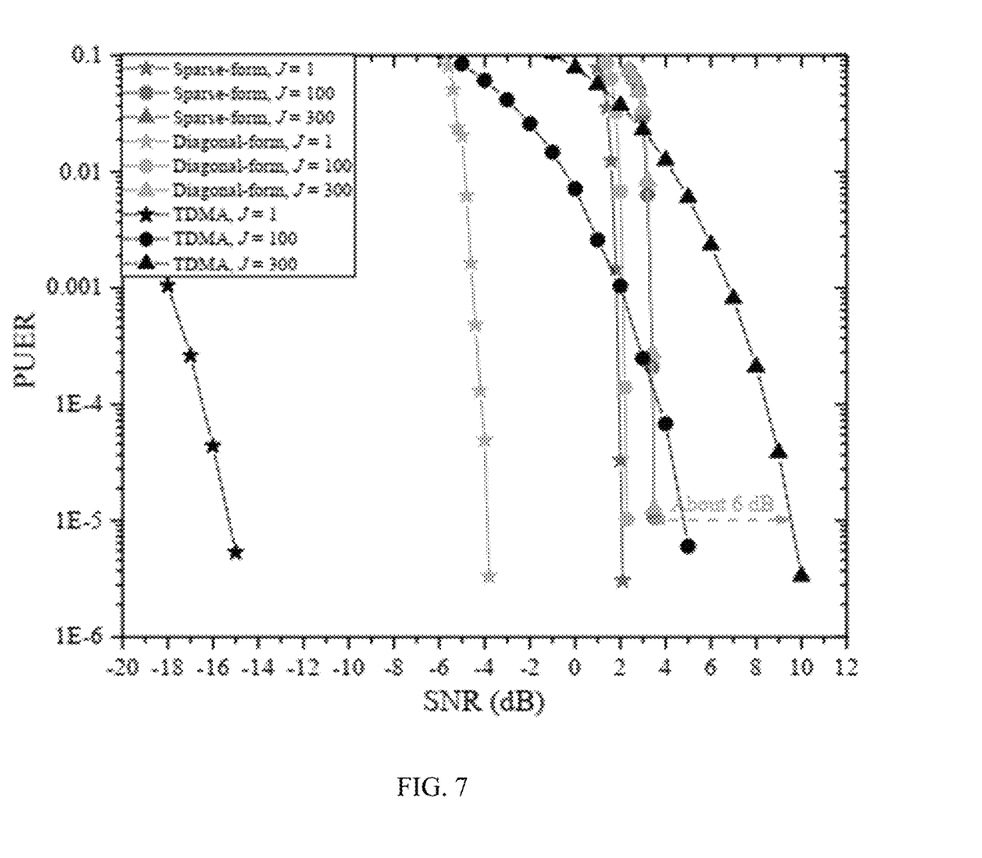
FIG. 7 is a performance plot of the present disclosure applied into uplink massive multiple-access transmission scenario.

The proposed FFMA have been applied into uplink massive multiple-access transmission scenario, which providing a better bit error rate (BER) performance than the classical multiple-access system, as shown in FIG. 7.

When the proposed FFMA-TDMA is compared with the classical TDMA systems, when the number of users is small, e.g., J=1, the TDMA with repetition code can provide much better PUER performance, since the coding gain is around 27.78 dB. However, for a large number of arrival users, e.g., J≥100, the proposed FFMA-TDMA systems provide much better PUER performance. When Pb=$10^{-5}$ and J=300, the FFMA-TDMA system can provide about 6 dB coding gain than the TDMA system, verifying the proposed FFMA system can improve the PUER performance for a massive users scenario.

The present disclosure can be implemented with a hardware in different applications. The hardware can comprise, but not limited to, a processor, a memory, a circuitry, or any other forms to store the application.

The applications of the present disclosure are only for detailing the present disclosure rather than limitations to the embodiments of the present disclosure. Those skilled in the arts can also make other changes or variations of different forms on the basis of the above descriptions and cannot exhaust all embodiments herein. Those obvious changes or variations derived from the technical solutions of the present disclosure shall all fall within the scope of protection of the present disclosure.

What is claimed is:

1. A user-distinguished finite-field resource construction method, executed by a processor, wherein the construction method is a basic-field resource construction method and comprises the following steps:

let GF(p) be a prime field, and p−1 nonzero elements in the field are divided into (p−1)/2 mutually-disjoint element pairs EP, wherein each EP comprises two elements, k and additive inverse p−k in the field, and the element pair (k, p−k) is referred to as additive inverse element pair AIEP; such division is denoted as P;

let J be a positive integer not greater than (p−1)/2, namely, 1≤J≤(p−1)/2; let $C_1, C_2, \ldots, C_J$ be J AIEPs in the P, and thus $C_j=(t_j, p-t_j)$; wherein 1≤j≤J, 1≤$t_j$≤p; $t_j$ is a nonzero element in GF(p), and C refers to a set $\{C_1, C_2, \ldots, C_J\}$;

let $(u_1, u_2, \ldots, u_J)$ be one J tuple on GF(p), wherein $u_j$ is one element in $C_j$; and thus the J tuple $(u_1, u_2, \ldots, u_J)$ is one element in Cartesian product $C_1 \times C_2 \times \ldots \times C_J$; the mod p of each element and $\tau = \oplus_{j=1}^{J} u_j$ in the tuple are referred to as finite-field sum-pattern (FFSP) of the J tuple; wherein $\oplus$ represents modular addition operation;

the J tuple $(p-u_1, p-u_2, \ldots, p-u_J)$ is also one element in Cartesian product and its sum pattern is $p-\tau = p - \oplus_{j=1}^{J} u_j$; if the sum pattern of the $(u_1, u_2, \ldots, u_J)$ is 0, the sum pattern of the $(p-u_1, p-u_2, \ldots, p-u_J)$ is also 0;

let $(u_1, u_2, \ldots, u_J)$ and $(u'_1, u'_2, \ldots, u'_J)$ be two J tuples in $C_1 \times C_2 \times \ldots \times C_J$; if $\oplus_{j=1}^{J} u_j \neq \oplus_{j=1}^{J} u'_j$, one sum pattern uniquely specifies one J tuple in $C_1 \times C_2 \times \ldots \times C_J$, namely, $$(u_1, u_2, \ldots, u_J) \leftrightarrow \bigoplus_{j=1}^{J} u_j$$

is one one-to-one mapping;

given one sum pattern $\tau = \oplus_{j=1}^{J} u_j$, a corresponding J tuple $(u_1, u_2, \ldots, u_J)$ is uniquely restored; the $C_1 \times C_2 \times \ldots \times C_J$ is said to have a unique sum pattern mapping structure USPM, and J≤$\log_2(p-1)$;

for the set $C=\{C_1, C_2, \ldots, C_J\}$ formed by J AIEPs, if the set has a USPM structure, the set serves as a finite-field resource in multiple access communication;

in one multiple access communication system, J AIEPs are assigned to J users; if each user respectively transmits a corresponding AIEP symbol, a transmitter collects J transmission symbols, obtains finite-field sum-pattern (FFSP) $\tau=\oplus_{j=1}^{J}u_j$ and sends the sum pattern over a multiple access channel; the J transmission symbols are restored uniquely and unambiguously by the sum pattern $\tau$;

if each J tuple is seen as codewords of J users, the set $C=C_1\times C_2\times \ldots \times C_J$ forms one J user code totaling $2^J$ codewords in GF(p); $C=C_1\times C_2\times \ldots \times C_J$ is said to be one AIEP code uniquely decodable by the J users in GF(p), which is denoted as J user UDAIEP code; when this code is used in a J user multiple access communication system, the symbol sent by the j-th user corresponds to the j-th component $u_j$ of the codewords.

2. A user-distinguished finite-field resource construction method, wherein the construction method is an extension-field resource construction method, and comprises the following steps:

based on the basic-field resource constructed in claim 1, $GF(p^m)$ is an extension field of the GF(p), m is an integer, and an m-order primitive polynomial of the $GF(p^m)$ is expressed as:

$$g(X)=g_0+g_1X+gX^2+\ldots+g_mX^m$$

in this field, there are a total of $p^m$ elements, and $g_0$, $g_1, \ldots, g_m$ are elements in the GF(p);

let $\alpha$ be a primitive element of the $GF(p^m)$; thus, the elements in the field are represented as $0,1,\alpha,\alpha^2, \ldots, \alpha^{p^m-2}$; each element is expressed by a linear combination of $\alpha^0=1,\alpha,\alpha^2, \ldots \alpha^{m-1}$, and coefficients of the linear combinations all belong to the GF(p), namely, $$\alpha^j=\alpha_{j,0}+\alpha_{j,1}\alpha+\alpha_{j,2}\alpha^2+\ldots+\alpha_{j,m-1}\alpha^{m-1}$$

wherein the coefficient of the linear combination $\alpha^j=\alpha_{j,0}$, $\alpha_{j,1}, \alpha_{j,2}, \ldots, \alpha_{j,m-1}$ is an element in the GF(p);

from the above formula, it is seen that $\alpha^j$ is expressed uniquely by the m tuple $(\alpha_{j,0}, \alpha_{j,1}, \ldots, \alpha_{j,m-1})$; thus, a sum of two elements in the extension field is expressed as:

$$\alpha^j+\alpha^k=(\alpha_{j,0}+\alpha_{k,0})+(\alpha_{j,1}+\alpha_{k,1})\alpha+\ldots+(\alpha_{j,m-1}+\alpha_{k,m-1})\alpha^{m-1}$$

the corresponding m tuple is expressed as:

$$((\alpha_{j,0}+\alpha_{k,0}),(\alpha_{j,1}+\alpha_{k,1}), \ldots (\alpha_{j,m-1}+\alpha_{k,m-1}))$$

for $0\le i\le m$, if $(\alpha_{j,i},\alpha_{k,i})$ is an additive inverse element pair on the GF(p), namely, $\alpha_{j,i}+\alpha_{k,i}=0$, then, $\alpha^j+\alpha^k=0$, namely, $(\alpha^j,\alpha^k)$ is one AIEP on the $GF(p^m)$; if $(\alpha_{j,i},\alpha_{k,i})$ is a nonzero AIEP on the GF(p), then $\alpha^i(\alpha_{j,i},\alpha_{k,i})\square(\alpha_{j,i}\alpha^i,\alpha_{k,i}\alpha^i)$ is one AIEP on the $GF(p^m)$;

let $C=(C_1,C_2,\ldots,C_J)$ be an AIEP set on the GF(p), and have a USPM structure; let $C_j=(t_j, p-t_j)$, and use $\psi_i(t_j, p-t_j)$ to represent an AIEP on the $GF(p^m)$:

$\alpha^i C_j=(t_j\alpha^i, (p-t_j)\alpha^i)$, thus, $\Psi_i=\{\psi_i(t_1, p-t_1), \psi_i(t_2, p-t_2), \ldots, \psi_i(t_J, p-t_J)\}$ is an AIEP set with the USPM structure on the $GF(p^m)$; the Cartesian product of the elements in the $\Psi_i$ forms a J user UDAIEP code containing $2^J$ codewords on the $GF(p^m)$; for $i=0,1,\ldots,m-1$, m J user UDAIEP codes are constructed, and $\Psi_0,\Psi_1,\ldots,\Psi_{m-1}$ are mutually disjoint;

the elements in the AIEP pair $\psi_i(t_j, p-t_j)=(t_j\alpha^i,(p-t_j)\alpha^i)$ are expressed by the m tuple in the following form; in the m tuple, $t_j$ and $p-t_j$ appear at the i-th position with other positions being zero, namely:

$$\psi_i(t_1, p-t_1)=((0,0,\ldots,t_1,0,\ldots,0),(0,0,\ldots,p-t_1,0,\ldots,0))$$

$$\psi_i(t_2, p-t_2)=((0,0,\ldots,t_2,0,\ldots,0),(0,0,\ldots,p-t_2,0,\ldots,0))$$

.

.

.

$$\psi_i(t_m, p-t_m)=((0,0,\ldots,t_m,0,\ldots,0),(0,0,\ldots,p-t_m,0,\ldots,0))$$

wherein $\Psi_0,\Psi_1,\ldots,\Psi_{m-1}$ defines m orthogonal UDAIEPs corresponding to J users;

$\Psi\square\Psi_0\cup\Psi_1\cup\ldots\cup\Psi_{m-1}$ forms one Jm user orthogonal UDAIEP code containing $2^{Jm}$ codewords on the $GF(p^m)$.

3. A finite-field multiple access system, wherein a finite-field resource in the system is an extension-field resource constructed using the user-distinguished finite-field resource construction method of claim 2;

a downlink in the system uses a downlink transmission method using a finite-field resource to perform downlink transmission; an uplink uses an uplink transmission method using a finite-field resource to perform uplink transmission;

the downlink transmission method using the finite-field resource uses as a finite field the basic-field resource constructed using the user-distinguished finite-field resource construction method or the extension-field resource constructed using the user-distinguished finite-field resource construction method to achieve downlink transmission, which comprises the following specific steps:

the basic-field resource or extension-field resource of the finite field is used as a multiple access resource, the finite field is GF(p), and p>2; thus, the number of users supported by a finite-field multiple access system is $J\le\lfloor\log 2(p-1)\rfloor$, and based on the process of constructing the basic-field resource or extension-field resource, the J user UDAIEP code, i.e. $C_1,C_2,\ldots,C_J$ is constructed as a multiple access resource and the user j is assigned a codebook $C_j$;

let k be a positive number, and $b_j=(b_{j,0},b_{j,1},\ldots,b_{j,k},\ldots b_{j,K-1})$ is a raw information sequence sent to the j-th user, where $b_{j,k}\in GF(2)$; during sending, one UDAIEP, i.e. $C_j$, is assigned to the user j, the $b_{j,k}$ is mapped into $u_{j,k}$, wherein $u_{j,k}\in C_j$; the mapping is a mapping from a binary field to a non-binary field; this process is expressed using the function $F_{B2NB}$, i.e. $u_{j,k}=F_{B2NB}(b_{j,k})$; the sequence $b_j$ sent to the user j is mapped to generate a sequence denoted as $u_j=(u_{j,0}, u_{j,1},\ldots,u_{j,k},\ldots,u_{j,K})$, and then the J tuple $(u_{0,k}, u_{1,k},\ldots,u_{J,k})$ is one codeword of the J user UDAIEP code;

J sequences sent by performing multiplexing: symbols on the corresponding positions of multiple user information sequences are added up on the GF(p); an obtained result is denoted as $u=(u_0,u_1,\ldots,u_k,\ldots u_{K-1})$, wherein $u_k=\oplus_{j=1}^{J}u_{j,k}$; the multiplexed sequence u is finite-field sum-pattern (FFSP) of the J user UDAIEP code C;C is uniquely decodable, and the J sequences $u_1,u_2,\ldots,u_J$ are decoded symbol-wise from u without ambiguity, and the process of decoding the J sequences symbol-wise is denoted as $F_{NB2B}$;

in a downlink system, a sequence w prior to channel encoding is obtained based on the sequence u, and a (N, K) linear block code on GF(Q) is used as a channel encoding v; then the symbols are mapped to a complex field, and then OFDM transmission process is performed;

finally, the sequence of each user is decoded symbol-wise by using an OFDM receiver;

the uplink transmission method using the finite-field resource uses as a finite field the extension-field resource constructed using the user-distinguished finite-field resource construction method to achieve uplink transmission, which comprises the following specific steps:

the extension-field resource is used as a multiple access resource, and based on GF($2^m$), the basic field is GF(2), which only has one element pair (0,1); using the element pair, m orthogonal UDEPs are constructed on the GF($2^m$):

$$\Psi=\{\psi_0(0,1),\psi_1(0,1),\ldots,\psi_i(0,1),\ldots,\psi_{m-1}(0,1)\}$$

if the system supports at most J users, the user J is assigned EP $\psi_{J-1}(0,1)$;

let K be an integer, and $b_j=(b_{j,0},b_{j,1},\ldots,b_{j,k},\ldots,b_{j,K-1})$ is a binary information sequence sent by the user j; the transmitter firstly maps the sequence symbol-wise from the GF(2) to the non-binary field GF($2^m$) to generate a sequence $u_j$, i.e. $u_{j,k}=F_{B2NB}(b_{j,k})$, wherein $u_{j,k} \in GF(2^m)$; this mapping relationship is determined by EP $\psi_{j-1}(0,1)$ assigned to the user j, and $u_{j,k}$ is expressed by a binary m tuple, $u_{j,k}=(u_{j,k,0},u_{j,k,1},\ldots,u_{j,k,i},\ldots,u_{j,k,m-1})$, wherein, $$u_{j,k,i} = \begin{cases} b_{j,k}, & i=j-1 \\ 0, & i \neq j-1 \end{cases}$$

by adding the (N, K) linear block code W, channel encoding is performed on the sequence $u_j$ to generate a sequence $v_j$, wherein W is a code on the GF($2^m$), and a generated matrix G is K×N dimensions; after encoding, there is:

$$v_j=u_jG=(v_{j,0},v_{j,1},\ldots,v_{j,n},\ldots,v_{j,N-1})$$

and $v_{j,n} \in GF(2^m)$; and $v_{j,n}$ is expressed by using a binary m tuple $v_{j,n}=(v_{j,n,0},v_{j,n,1},\ldots,v_{j,n,i},\ldots,v_{j,n,m-1})$; $u=\oplus_{j=1}^J u_j$ is defined as finite-field sum-pattern (FFSP) of the raw information sequence, and $u=(u_0,u_1,\ldots,u_k,\ldots,u_{K-1})$, $u_k=\oplus_{j=1}^J u_{j,k}$; $v=\oplus_{j=1}^J v_j$ is defined as finite-field sum-pattern (FFSP) of the encoded information sequence, and $v=(v_0,v_1,\ldots,v_n,\ldots,v_{N-1})$, wherein $v_n=\oplus_{j=1}^J v_{j,n}$, $v=uG$;

then, modulation is performed using BPSK to obtain a complex-field vector $x_j \in \square^{1 \times Nm}$, $x_j=(x_{j,0},x_{j,1},\ldots,x_{j,n},\ldots,x_{j,N-1})$, $x_{j,n}=(x_{j,n,0},x_{j,n,1},\ldots,x_{j,n,i},\ldots,x_{j,n,m-1})$, and $x_{j,n,i}=2v_{j,n,i}-1$; this mapping relationship is denoted as $F_{F2C}$, that is, a mapping from the finite field to a complex-field; then $x_j$ is sent to AWGN multiple access channel;

at the receiver, the received complex-field signal vector $y \in \square^{1 \times Nm}$ is a result of superimposition of the signals sent by J users through the channel, namely, $$y = \sum_{j=1}^{J} x_j + z = r + z$$

wherein z is noise, r is finite-field sum-pattern (FFSP) of the complex-field modulation signal sequence $x_1$, $x_2,\ldots,X_J$, which is composed of N m tuples, and written as $r=(r_0,r_1,\ldots,r_n,\ldots,r_{N-1})$, wherein $r_n=(r_{n,0},r_{n,1},\ldots,r_{n,i},\ldots,r_{n,m-1})$;

$$r_{n,i} = \sum_{j=1}^{J} x_{j,n,i} = 2\sum_{j=1}^{J} x_{j,n,i} - J$$

in the first step of decoding reception, by using a conversion function $F_{C2F}$ from the complex-field to the finite field, the complex-field signal is converted into a vector on the GF($2^m$), $F_{C2F}(r)=v=(v_0,v_1,\ldots,v_n,\ldots,v_{N-1})$ is composed of N m tuples, and the n-th element is expressed as $v_n=(v_{n,0},v_{n,1},\ldots,v_{n,i},\ldots,v_{n,m-1})$, wherein, $$v_{n,i} = F_{C2F}(r_{n,i}) = \bigoplus_{j=1}^{J} v_{j,n,i}$$

next, $\hat{y}=F_{C2F}(r)+z$ is constructed and then input into a decoder decoding restoration sequence $\hat{v}$ of the channel encoding W;

an on-field inverse mapping $F_{NB2B}$ is made by the part corresponding to the transmitter to restore the raw sequence $\hat{b}_1,\hat{b}_2,\ldots,\hat{b}_J$ sent by each user.

4. The finite-field multiple access system of claim 3, wherein in the downlink transmission method using the finite-field resource, a process of obtaining the sequence w prior to channel encoding based on the sequence u comprises:

if p and Q are unequal, mapping the sequence u symbol-wise to the sequence w and then performing encoding;

if p and Q are equal, directly using the sequence u as the sequence w and then performing encoding is.

5. The finite-field multiple access system of claim 4, wherein in the downlink transmission method using the finite-field resource, when p and Q are unequal, $t=\lceil \log_2(p-1)\rceil$ and $Q=2^t$ are set.

6. The finite-field multiple access system of claim 3, wherein in the downlink transmission method using the finite-field resource, symbol-wise decoding the sequence of each user by using the OFDM receiver comprises the following steps:

the receiver is a reverse process: firstly, a guard interval is removed, and then FFT transform, FDE and parallel-serial conversion are performed to obtain a complex field signal y, and then a restored sequence $\hat{v}$ is obtained through transform from the complex field to the finite field, and then a sequence $\hat{w}$ is obtained through channel decoding, and then the sequence is symbol-wise mapped from the GF(Q) to the GF(q), which is completely opposite to the mapping of the transmitter; further, a sequence $\hat{u}$ is obtained; if $\hat{u}=u$, the sequence of each user is decoded symbol-wise.

7. The finite-field multiple access system of claim 3, wherein in the uplink transmission method using the finite-field resource, the $F_{C2F}$ has the following characteristics:

the value of $r_{n,i}$ obtained by BPSK modulation is: $\Omega=\{-J,-J+2,\ldots,J-2,J\}$;

the value of $v_{n,i} \in GF(2)$ is only $(0)_2$ or $(1)_2$ corresponding to the value $\Omega$ of the $r_{n,i}$, the value of the $v_{n,i}$ is $\Omega_v=\{0,1,0,1\ldots\}$, that is: if $r_{n,i}=-J$, then $v_{n,i}=0$; if $r_{n,i}=-J+2$, then $v_{n,i}=1$.

8. The finite-field multiple access system of claim 3, wherein in the uplink transmission method using the finite-field resource, in a process that $\hat{y}$ is constructed and then input into the decoder decoding restoration sequence $\hat{v}$ of the channel encoding W, if soft decoding is used, a prior probability of the $r_{n,i}$ prior probability distribution is $$P_r = \{C_J^0/2^J, C_J^1/2^J, \ldots, C_J^{J-1}/2^J, C_J^J/2^J\}.$$

9. The finite-field multiple access system of claim 4, wherein in the downlink transmission method using the finite-field resource, symbol-wise decoding the sequence of each user by using the OFDM receiver comprises the following steps:

the receiver is a reverse process: firstly, a guard interval is removed, and then FFT transform, FDE and parallel-serial conversion are performed to obtain a complex field signal y, and then a restored sequence v̂ is obtained through transform from the complex field to the finite field, and then a sequence ŵ is obtained through channel decoding, and then the sequence is symbol-wise mapped from the GF(Q) to the GF(q), which is completely opposite to the mapping of the transmitter; further, a sequence û is obtained; if û=u, the sequence of each user is decoded symbol-wise.

10. The finite-field multiple access system of claim 5, wherein in the downlink transmission method using the finite-field resource, symbol-wise decoding the sequence of each user by using the OFDM receiver comprises the following steps:

the receiver is a reverse process: firstly, a guard interval is removed, and then FFT transform, FDE and parallel-serial conversion are performed to obtain a complex field signal y, and then a restored sequence v̂ is obtained through transform from the complex field to the finite field, and then a sequence ŵ is obtained through channel decoding, and then the sequence is symbol-wise mapped from the GF(Q) to the GF(q), which is completely opposite to the mapping of the transmitter; further, a sequence û is obtained; if û=u, the sequence of each user is decoded symbol-wise.

11. The finite-field multiple access system of claim 7, wherein in the uplink transmission method using the finite-field resource, in a process that ŷ is constructed and then input into the decoder decoding restoration sequence v̂ of the channel encoding W, if soft decoding is used, a prior probability of the $r_{n,i}$ prior probability distribution is $$P_r = \{C_J^0/2^J, C_J^1/2^J, \ldots, C_J^{J-1}/2^J, C_J^J/2^J\}.$$

* * * * *